United States Patent [19]

Sundet

[11] Patent Number: 4,719,062
[45] Date of Patent: Jan. 12, 1988

[54] EXTRACTANT-SURFACTANT POST-TREATMENTS OF PERMSELECTIVE COMPOSITE MEMBRANES

[75] Inventor: Sherman A. Sundet, Wilmington, Del.

[73] Assignee: E. I. Du Pont de Nemours and Company, Wilmington, Del.

[21] Appl. No.: 854,927

[22] Filed: Apr. 23, 1986

[51] Int. Cl.$^4$ .............................. C08J 9/42; C08J 9/28
[52] U.S. Cl. ...................................... 264/41; 210/490; 210/500.38; 264/232; 264/340; 264/344
[58] Field of Search ................. 264/41, 344, 232, 340; 210/500.38, 490

[56] References Cited

U.S. PATENT DOCUMENTS

| | | | |
|---|---|---|---|
| 3,808,303 | 4/1974 | Ganci et al. | 264/41 |
| 4,262,094 | 4/1981 | Johnson | 264/41 X |
| 4,272,467 | 6/1981 | Johnson | 264/41 |
| 4,277,344 | 7/1981 | Cadotte | 210/654 |
| 4,471,110 | 9/1984 | Christell | 210/500.38 X |
| 4,481,260 | 11/1984 | Nohmi | 264/41 X |
| 4,520,044 | 5/1985 | Sundet | 427/244 |
| 4,529,646 | 7/1985 | Sundet | 428/315.5 |

*Primary Examiner*—Philip Anderson

[57] ABSTRACT

A treatment process for treating an interfacially polymerized polyaramide on a microporous support reverse osmosis membrane. The treatment involves immersing the membrane in an aqueous solution containing 5 to 25 weight percent of an alcohol having 1-5 carbon atoms for 15 minutes to two hours at a pressure of 50 to 100 psi. Optionally, the membrane can be treated with a surfactant.

4 Claims, No Drawings

EXTRACTANT-SURFACTANT POST-TREATMENTS OF PERMSELECTIVE COMPOSITE MEMBRANES

BACKGROUND OF THE INVENTION

The present invention relates to treating composite polyaramide reverse osmosis membranes with dilute aqueous solutions of lower alkanols. In a preferred aspect of the invention the membranes are also treated with a dilute aqueous solution of a surfactant.

PRIOR ART

U.S. Pat. No. 3,808,303 discloses treating anisotropic polyaramide reverse osmosis membranes with ethers and polyethers with carbon to oxygen ratios of from 2 to 1 to 5 to 1 and molecular weight of more than 400.

U.S. Pat. No. 4,277,344 discloses permselective multi-layer membranes in which there is a microporous polysulfone substrate layer and a superposed polyamide layer made from trimesoyl halide and an aromatic diamine.

DETAILED DESCRIPTION

The present invention involves the discovery that the salt rejection performance of supported interfacially polymerized polyaramide reverse osmosis membranes can be improved by treatment with an aqueous solution of an alcohol containing 1 to 5 carbon atoms. All of the alcohols tested have been satisfactory for use in the present invention except 3-methyl-1-butanol. Generally, the alcohol will be present in the treating solution in an amount of from 2.5 to 25 percent by weight. Generally, the treatment is carried out at a temperature of from 10° to 50° C. with ambient temperature being preferred for reasons of simplicity. Advantageously the treatment is carried out in a permeation cell or membrane cartridge using relatively low pressures to force the aqueous alcohol through the membrane. Generally, the treatment is carried out using a pressure of 50 to 250 psi ($35 \times 10^4$ to $175 \times 10^4$ Pa). Higher pressures can be used but are unnecessary. Lower pressures are less effective as it is desired to completely wet all of the interstices within the membrane. Generally, the extraction takes from 15 minutes to 2 hours with 30 minutes to an hour being preferred. The alcohol treatment provides a marked improvement in the salt rejection of the membrane. The alcohol treatment may also result in an increase in water passage or flux. This is quite surprising since most known treatments which reduce salt passage also reduce flux.

In a preferred aspect of the invention the membrane is treated with an aqueous solution containing 10-1000 ppm of a surfactant. The surfactant may be included in the alcoholic solution or be used separately either before or after the alcohol treatment. Preferred surfactants are of the nonionic type, i.e. a surface active molecule consisting of a hydrophobic residue linked covalently to a residue that is hydrophilic by virtue of a polyhydroxylic or polyether structure rather than by virtue of a charged group such as sulfonate, carboxylate or quaternary ammonium groupings. Good results have also been had with some cationic structures.

The membranes being treated herein are supported on a microporous support. The preferred supports are the polysulfones. The support should have pores less than 20 mm in diameter. The support in turn may be supported on a structurally stronger support, such as a woven or non-woven fabric. The support may also be in the form of a hollow fiber. Preparation of the support is readily accomplished by casting from a 10 to 20 weight % and preferably 14–18 weight % solution of the polysulfone in a polar organic solvent. The preferred solvent is dimethyl formamide but other polar solvents such as dimethyl acetamide and N-methylpyrrolidone may also be used.

The freshly cast polysulfone substrate is immediately quenched in an aqueous solution which preferably contains 0.1–10% by weight, more preferably 0.5–5% by weight and most preferably 1–3% by weight of m-phenylenediamine. By immediately, we mean within 30 seconds and preferably within 3 seconds. Even with this short a period between casting and quenching, partial evaporation of the solvent can occur. Alternatively, the polysulfone solution can be directly cast or extruded into the aqueous solution of phenylenediamine. This serves to load the polysulfone substrate with phenylenediamine. The concentration of the diamine is an important factor in the performance of the resulting composite since it may control the uniformity and thickness of the ultimate polyamide supported on the substrate. If the coating is nonuniform, it is apt to have or develop small holes which adversely affect salt rejection of the membrane. Optionally, the diamine solution can contain up to 10 weight % polar organic solvent such as dimethyl formamide. Excess solution is removed from the surface of the substrate by a drawing, rolling, sponging or other suitable procedure such as the use of an air-knife.

The loaded substrate is then contacted with a solution of trimesoyl chloride, cyclohexane-1,3,5-tricarbonyl chloride, or mixtures thereof, optionally containing up to 50 weight % of either isophthaloyl chloride or terephthaloyl chloride, in a water-immiscible solvent, which does not adversely affect the porous structure of the polysulfone substrate, for 5–90 and preferably 10–30 seconds at room temperature. The preferred solvents for this step are hexane and the chlorofluorocarbons such as 1,1,2-trichloro-1,1,2-trifluoroethane. Formation of the polyamide causes the originally shiny substrate to develop a dull finish.

The resulting composite is then dried at temperatures of 20°–100° C., preferably 50°–70° C. for 5–180 seconds, preferably 15–60 seconds or longer periods of time at the lower temperatures; then subsequently extracted in water at 50°–60° C. for 5–10 minutes and stored in deionized water.

The acid halide used should be at least 50 weight % of trifunctional acid halide. The remaining acid halide can be a difunctional acid halide wherein the acid halide groups are attached to a 5 or 6-carbon atom ring moiety. Preferred of these is isophthaloyl chloride or mixtures thereof with up to 40 weight % based on diacid chloride of terephthaloyl chloride.

EXAMPLES

Membrane Testing

The flux is reported as Kw in m.s.$^{-1}$ TPA$^{-1}$ $$KW = \frac{\text{Flux}}{\text{Effective Pressure}}$$

Effective Pressure is gauge pressure minus osmotic pressure difference.

The salt passage is reported as SP in %.

$$SP = \frac{C_p}{C_f} \times 100$$

where $C_p$ is the concentration of NaCl in the permeate and $C_f$ is the concentration of salt in the feed.

In the Examples all treating and testing was done at ambient temperature, unless otherwise stated. Unless otherwise stated the membranes were tested with 2.1 g/l NaCl in water at 420 psi ($29 \times 10^5$ Pa).

EXAMPLE 1

A microporous polysulfone substrate was prepared by casting a 17% solution of a polysulfone derived from bisphenol A and p,p'-dichlorodiphenyl sulfone having a molecular weight of about 35,000 in dimethylformamide, on a calendered and scoured sailcloth. The solution was spread uniformly using a casting knife. After casting, the structure was promptly quenched in water. After extracting in water at 50° C., the structure had an overall thickness of 6 to 6.3 mils ($15 \times 10^{-5}$ m to $16 \times 10^{-5}$ m) and a coating weight of 18.4–18.5 g/m$^2$, with pores less than 20 nm in diameter. The substrate was impregnated with 3% aqueous m-phenylenediamine, the surface liquid stripped off, and the loaded substrate was then reacted with 1,3,5-cyclohexanetricarbonyl (AC) chloride in "Freon" TF (1,2,2-trichloro-1,1,2trifluoroethane) dried and extracted in water as indicated:

| Membrane | ACConc % w/v | Reaction Secs. | Dried Mins./Temp. | Extracted Mins./Temp. |
|---|---|---|---|---|
| Comp. A | 0.1% | 45 | 3/62–65° C. | 2.7/46°–53° C. |
| Comp. B | 0.3% | 10 | 1.3/62–65° C. | 1.2/46°–53° C. |

EXAMPLE 2

To determine an appropriate extraction time under conditions of moderately low pressure, a series of membranes (Comp. A) from Example 1 were compared by treating with 10% aqueous ethanol at 85 psig ($59 \times 10^4$ Pa) in a permeating mode.

| Extraction Time | Salt Passage, % | Kw m/s/TPa |
|---|---|---|
| Unextracted | 6.02 | 5.84 |
| 15 mins. | 3.68 | 5.66 |
| 45 mins. | 2.27 | 6.08 |
| 120 mins. | 2.54 | 6.31 |

This Example illustrates the unexpected result, i.e., an increase in Kw with a decrease in salt passage which is very useful. When the 45 minute alcohol-water extraction above was followed by a 60-minute treatment with 20 ppm of TMaz 28 (nonionic surfactant from Mazer Chemical Co.) in water at 85 psi ($59 \times 10^4$ Pa) in a permeating mode the more normal changes in salt passage and Kw occurred.

| Membrane | Salt Passage, % | Kw m/s/TPa |
|---|---|---|
| 45 mins., TMaz | 2.02 | 4.21 |

EXAMPLE 3

The effect of alcohol concentration was examined with another supply of membranes (Comp. B) from Example 1. Each of the alcohol-water treatments (3–5) was carried out at 85 psi ($59 \times 10^4$ Pa) in a permeating mode for 45 minutes.

| Extraction | Salt Passage, % | Kw m/s/TPa |
|---|---|---|
| (1) Deionized water, room temperature | 3.11 | 8.63 (17.5 hrs.) |
| (2) Water, 5 mins. 57° C. | 2.87 | 9.64 (6.5 hrs.) |
| (3) Like (2), then 5% EtOH | 2.26 | 8.86 (6.5 hrs.) |
| (4) Like (2), then 10% EtOH | 2.23 | 9.65 (6.5 hrs.) |
| (5) Like (2), then 20% EtOH | 2.14 | 10.58 (6.5 hrs.) |

EXAMPLE 4

The same membrane as used in Example 3 (Comp. B) was used to compare different alcohols at the 10% aqueous alcohol level using 85 psi ($59 \times 10^4$ Pa) in a permeating mode for 45 minutes. The testing was done with 2.1 g/l NaCl at 420 psi ($29 \times 10^5$ Pa) for 17 hours.

| | Salt Passage, % | Kw m/s/TPa |
|---|---|---|
| (1) Methanol | 3.10 | 9.37 |
| (2) i-Propanol | 2.99 | 9.11 |
| (3) n-Propanol | 1.82 | 9.65 |
| (4) t-Butanol | 2.14 | 9.38 |

When these membranes were subsequently treated in a permeating mode with 50 ppm of Macol LF111 in water for 60 minutes at 65–70 psi, significant improvements in salt passage were obtained using the same test conditions used above.

| | Salt Passage, % | Kw m/s/TPa |
|---|---|---|
| (1) Methanol | 1.99 | 9.38 |
| (2) i-Propanol | 2.22 | 8.87 |
| (3) n-Propanol | 1.37 | 9.12 |
| (4) t-Butanol | 1.78 | 9.12 |

While the alcohols differed in their initial effect on the permeability properties of the membrane, all the membranes treated with the nonionic surfactant decreased further in salt passage without undergoing much loss in Kw. Note that this is significantly different from that observed with TMaz 28 in Example 2.

EXAMPLE 5

This Example shows the differences among surfactants in a comparison in which four different agents were used at a level of 50 ppm in 10% aqueous ethanol, treating for 45 minutes at 65–70 psi ($45 \times 10^4$–$48 \times 10^4$ Pa) in a permeating mode, thus effecting a combined alcohol-surfactant treatment. The membrane was Comp. B. The membranes were tested with 2.1 g/l NaCl in water for 24 hours at 420 psi ($29 \times 10^5$ Pa).

|   | Salt Passage, % | Kw m/s/TPa |
|---|---|---|
| (1) Macol 18 (Mazer Chemical Co.) | 2.26 | 10.93 |
| (2) Macol LF111 (Mazer Chemical Co.) | 1.89 | 10.58 |
| (3) Tergitol 15S15 (Union Carbide) | 1.83 | 9.94 |
| (4) Tween 60 (ICI, U.S.) | 1.89 | 7.63 |

EXAMPLE 6

When the alcohol was used as a post-treatment after the surfactant, quite parallel performance was observed. Using Comp. B from Example 1 which had a salt passage of 3.1% and a Kw of 9.37 m/s/TPa the comparisons below were obtained by testing a membrane which had been treated in a permeating mode with a 10% aqueous ethanol solution containing 50 ppm of the surfactant reported below at 85 psi ($59 \times 10^4$ Pa) for 45 minutes. The tests were run at 420 psi ($29 \times 10^5$ Pa) with 2.1 g/l aqueous NaCl.

| Surfactant | Salt Passage, % | Kw m/s/TPa |
|---|---|---|
| Macol 18 | 2.4 | 10.9 |
| Macol LF111 | 1.91 | 10.6 |
| Tergitol 15S15 | 1.89 | 7.93 |

Using Comp. B from Example 1 the comparisons below were obtained by testing membranes which had been treated in a permeating mode with a 50 ppm solution of the surfactant reported below at 85 psi ($59 \times 10^4$ Pa) for 60 minutes, followed by a treatment in a permeating mode in 20% aqueous ethanol solution for 45 minutes at 85 psi ($59 \times 10^4$ Pa). The tests were run at 420 psi ($29 \times 10^5$ Pa) with 2.1 g/l aqueous NaCl.

| Surfactant | Salt Passage, % | Kw m/s/TPa |
|---|---|---|
| Macol 18 | 2.09 | 10.2 |
| Macol LF111 | 1.66 | 9.64 |
| Tergitol 15S15 | 1.56 | 9.11 |
| Tween 20 | 1.52 | 6.98 |

Using Comp. B from Example 1 the comparisons below were obtained by testing membranes which had been treated in a permeating mode with a 50 ppm aqueous solution of the surfactant reported below at 70-80 psi ($59 \times 10^4$ Pa) for 45 minutes, followed by a treatment in a permeating mode in 20% aqueous normal propanol for 60 minutes at 60-70 psi ($59 \times 10^4$ Pa). The tests were run at 420 psi ($29 \times 10^5$ Pa) with 2.1 g/l aqueous NaCl.

| Surfactant | Salt Passage, % | Kw m/s/TPa |
|---|---|---|
| Macol 18 | 2.29 | 9.91 |
| Macol LF111 | 2.13 | 10.09 |
| Tergitol 15S15 | 2.04 | 10.2 |
| Tween 20 | 2.15 | 8.61 |

Note that the ranking of these surfactants is similar with the three different applications.

EXAMPLE 7

This Example illustrates that the amount of surfactant used is not particularly critical. The membrane used was Comp. B from Example 1 and the treatment was carried out in a permeating mode at 85 psi ($59 \times 10^4$ Pa) for 45 minutes. The membrane was tested at 420 psi ($29 \times 10^5$ Pa) using 2.1 g/l aqueous NaCl. In the tables below n-PrOH stands for aqueous normal propyl alcohol solution in the concentration indicated and EtOH stand for aqueous ethyl alcohol solution in the concentration indicated. In each, the surfactant was Macol 18 and it was used in the concentration reported in the table below.

| Treatment | Salt Passage, % | Kw m/s/TPa |
|---|---|---|
| 100 ppm in 10% n-PrOH | 1.62 | 9.1 |
| 200 ppm in 10% n-PrOH | 1.87 | 8.62 |
| 200 ppm in 10% EtOH | 1.69 | 8.4 |

EXAMPLE 8

Using Comp. B as the test membrane with Macol LF111 in higher concentrations and different sequences, some advantage was seen for separate surfactant and alcohol treatments. The treatment time and pressure and testing pressure and salt concentration in the table below were the same as in Example 7. The hours reported in the table below is the amount of time after the test was started until the salt passage and Kw values were recorded.

| Post-Treatment | Salt Passage, % | Kw m/s/TPa | Hours |
|---|---|---|---|
| 10% n-PrOH, then 50 ppm Macol LF111 | 1.37 | 9.12 | 4 |
| 50 ppm Macol LF111 in 10% EtOH | 1.91 | 10.6 | 17 |
| 100 ppm Macol LF111 in 10% EtOH | 1.89 | 8.85 | 17 |
| 200 ppm Macol LF111 in 10% EtOH | 1.84 | 8.4 | 17 |
| 50 ppm Macol LF111 in 20% EtOH | 1.91 | 8.62 | 17 |
| 100 ppm Macol LF111 in 20% EtOH | 2.14 | 8.85 | 17 |
| 50 ppm Macol LF111, then 10% EtOH | 1.66 | 9.64 | 18 |

EXAMPLE 9

A microporous polysulfone support prepared as in Example 1, was impregnated with 3% aqueous m-phenylene diamine, the surface liquid stripped off. The loaded surface was then reacted with 67:33 1,3,5-cyclohexanetricarbonyl chloride:trimesoyl chloride 3 g/l in "Freon" TF for 24 seconds, dried for 1⅓ minutes at 60° C. and extracted with water for 1 1/5 minutes at 50° C. The data reported below is salt passage/Kw in meters/second/TPa.

|  | 225 psi | 420 psi |
|---|---|---|
|  |  | After 5.5 hrs @ 420 psi |
| Extracted with Water Only | 2.06/7.08 | 1.99/6.96 |
|  | 2.55/7.40 | 2.34/7.11 |
| Extracted with 15% Ethanol | 2.08/9.31 | 1.55/8.85 |

-continued

|  | 225 psi | 420 psi |
| --- | --- | --- |
| (85 psi/60 mins) in permeation cell | 2.13/8.15 | 1.78/7.79 |
|  | After additional 17 hrs @ 225 psi | |
| Extracted with Water Only | 1.72/6.71 | 1.35/6.68 |
|  | 1.93/9.30 | 1.54/9.62 |
| Extracted With 15% Ethanol (85 psi/60 mins) in permeation cell | 2.05/7.39 | 1.68/8.84 |
|  |  | 1.65/7.61 |

EXAMPLE 10

A microporous polysulfone substrate was prepared by casting a 17% solution of a polysulfone derived from bisphenol A and p,p'-dichlorophenyl sulfone having a molecular weight of about 35,000 in dimethyl formamide on an AWA #18 non-woven fabric. The solution was spread uniformly using a casting knife. After casting, the structure was promptly quenched in water. After extracting in water at 50° C., the structure had an overall thickness of 7.4 mils ($19 \times 10^{-5}$m) and a coating weight of 48 g/m$^2$, with pores less than 20 mm in diameter. The substrate was impregnated with 1.3% aqueous m-phenylene diamine, the surface liquid stripped off, and the loaded substrate reacted with a 0.1% solution of trimesoyl chloride in "Freon" TF dried at 20° C. for 30 minutes and extracted in water for 5 minutes at 57° C. The membranes were testing using 2.1 g/l aqueous NaCl with the pressures and treatments reported below.

|  | 225 psi | 420 psi |
| --- | --- | --- |
| Untreated control |  |  |
| After 6.5 hrs @ 420 psi | 5.37/8.94 | 5.04/8.85 |
| Addn'l 17 hrs @ 225 psi | 7.88/8.53 | 4.67/8.39 |
| Extracted with 20% EtOH (85 psi/60 mins) in permeation cell |  |  |
| After 6.5 hrs @ 420 psi | 5.23/9.60 | 4.83/9.36 |
| Addn'l 17 hrs @ 225 psi | 5.33/9.16 | 4.63/9.09 |

I claim:

1. A process for improving the flux of an interfacially polymerized polyaramide permselective membrane supported on a microporous support comprising contacting said membrane with an aqueous solution of 2.5 to 25 weight percent of an alcohol having 1 to 5 carbon atoms, under a pressure of 50 to 250 psi for a period of 15 minutes to two hours.

2. The process of claim 1 wherein the polyamide is formed by interfacially polymerizing m-phenylenediamine with at least 50 weight percent, based on acid halide trimesoyl chloride or cyclohexane-1,3,5-tricarbonyl chloride and the remainder isophthaloyl chloride or terephthaloyl chloride.

3. The process of claim 2 wherein the alcohol contains from 1 to 4 carbon atoms.

4. The process of claim 3 wherein 10 to 10,000 ppm based on the solution of a surfactant is also applied to the membrane.

* * * * *